Aug. 10, 1948.  M. MALLORY  2,446,711
THROTTLE CONTROL FOR INTERNAL-COMBUSTION ENGINES
Filed Nov. 1, 1944
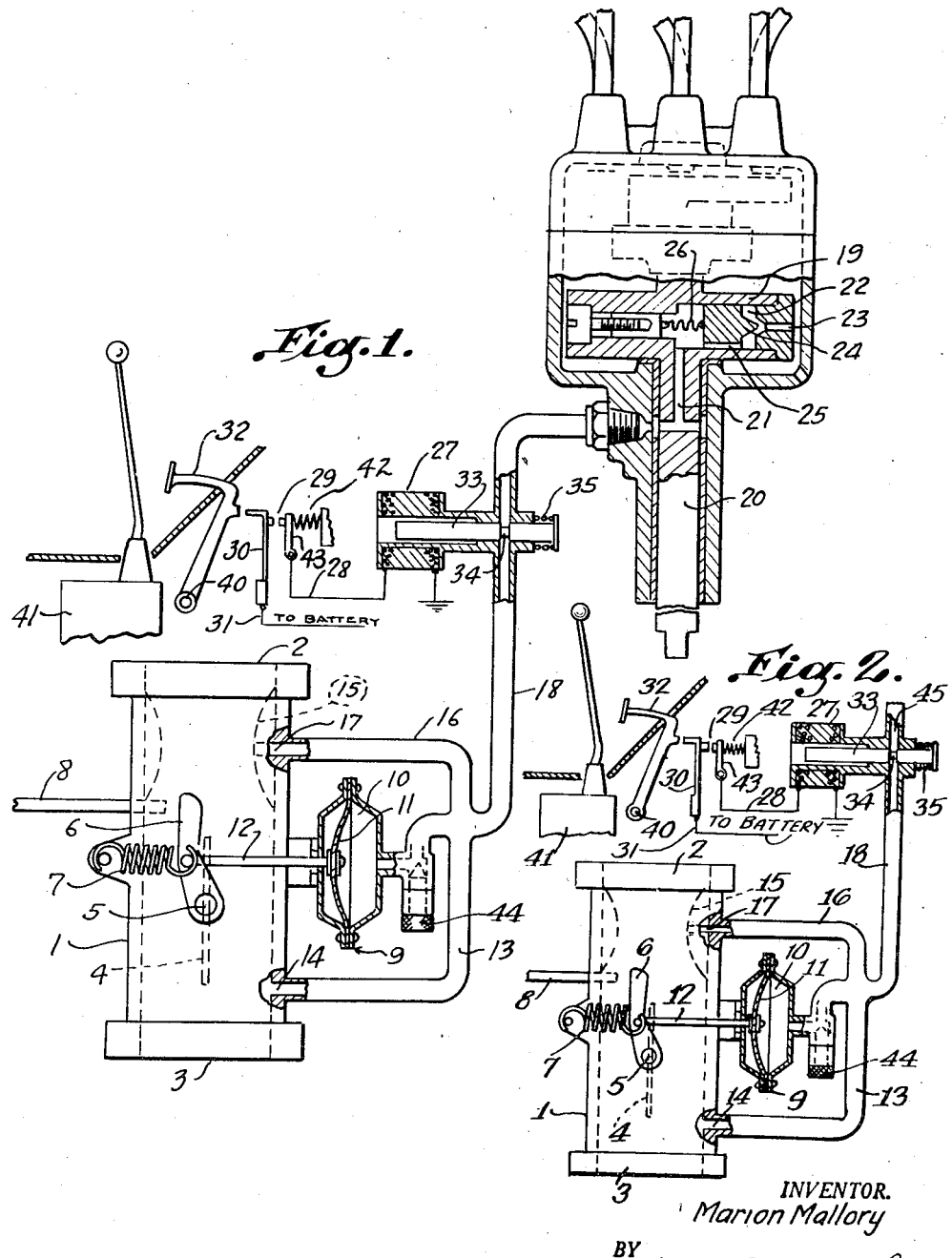
INVENTOR.
Marion Mallory Patented Aug. 10, 1948

2,446,711

UNITED STATES PATENT OFFICE 2,446,711

THROTTLE CONTROL FOR INTERNAL-COMBUSTION ENGINES

Marion Mallory, Detroit, Mich.

Application November 1, 1944, Serial No. 561,465

11 Claims. (Cl. 74—472)

This invention relates to a throttle control for an internal combustion engine.

Prior to, and while shifting the transmission gears in a vehicle or device driven by an internal combustion engine, it is very desirable to slow the speed of the engine down to idle or near idle so that the wear on the clutch will be minimized and the clashing of the gears will be prevented. This is true not only when the engine is manually or foot controlled but also when the engine speed is controlled by a governor.

It is the object of this invention to produce a throttle control which will automatically, preparatory to shifting gears, move the engine throttle to idle position to slow down the speed of the engine prior to and during the shifting of the gears to avoid excessive wear on the clutch and clashing of the transmission gears. This object is achieved by means of a suction device connected to the throttle valve which, prior to the shifting of the transmission gears, is subjected to, and responds to, the suction in the intake passageway to move the throttle valve to idle position.

In the drawing, Figure 1 shows one form of my throttle control for an internal combustion engine, and Figure 2 shows a modification thereof.

The parts which make up my throttle control are designated by numerals as follows: intake passageway 1, air or motive fuel inlet opening 2, outlet 3 to the internal combustion engine (not shown), butterfly throttle valve 4, valve shaft 5, journaled in housing 1, arm 6 fixed on shaft 5, tension spring 7 connected to arm 6 and tending to hold valve 4 open, push rod 8, either manually or foot operated, which upon movement to the right turns arm 6 to close valve 4. Spring 7 opens throttle 4 when rod 8 is retracted or moved toward the left. Suction device 9, suction chamber 10, flexible diaphragm 11 connected by rod 12 to crank arm 6, conduit 13 connecting suction chamber 11 with orifice 14 in the intake passageway on the engine side of valve 4, venturi 15, conduit 16 connecting suction chamber 10 with orifice 17 in venturi 15. Conduit 16 is preferred but can be omitted if desired.

Suction device 11 is arranged to be air bled to atmosphere by conduit 18. Conduit 18 can lead directly to atmosphere or, if desired, the air bleeding of conduit 18 can be automatically controlled by a centrifugal air bleed valve mechanism comprising valve housing 19 fixed on distributor shaft 20, passageway 21 connecting the valve cylinder 22 with conduit 18, orifice 23, valve 24 controlling orifice 23, passageway 25 connecting portions of the cylinder in front and in back of valve 24, tension spring 26 tending to hold centrifugally unbalanced valve 24 open, solenoid 27 connected to line 28, switch contact 29, spring contact carrying arm 30 and line 31 with the electric storage battery for the automotive vehicle, clutch pedal 32, solenoid core 33 provided with circumferential groove 34 aligned with the opening through conduit 18 when solenoid 27 is deenergized, compression spring 35 tending to hold groove 34 in communication with conduit 18. Parts 33 and 34 actually are a solenoid valve for closing or opening air bleed conduit 18. The engine is provided with a variable speed transmission 41 of the shiftable sliding gear type, but the transmission can also be a planetary gear transmission.

The operation of my device as shown is as follows: The suction device 9, throttle 4, conduits 13, 16 and 18 and the centrifugally controlled air bleed mechanism 20 to 26 acts as a governor to control the engine at a predetermined desired governed speed. When the engine reaches its governed speed after starting from idle, valve 24, due to centrifugal action, tends to close orifice 23 which causes the manifold suction through orifice 14 and conduit 13 to be established in chamber 10 and thereby cause diaphragm 11 to move valve 4 toward closed position to decrease the charge to the engine. When the speed of the engine falls slightly below its governed speed, valve 24 moves toward open position and bleeds suction chamber 10 which permits spring 7 to move valve 4 toward open position to maintain the speed of the engine. Assuming that the engine was operating under the governor at a governed speed of 2500 R. P. M. and the operator did not close throttle 4 to slow down the engine preparatory to shifting gears, the operator would necessarily, preparatory to shifting, move clutch pedal 32 clockwise about pivot 40 whereupon clutch pedal 32 would engage spring contact arm 30, closing contacts 29 which energizes solenoid 27 and draws solenoid valve 33 toward the left to close off completely conduit 18. The intake passageway suction acting through orifice 14, conduit 13, suction chamber 10 and flexible diaphragm 11 would immediately close throttle 4 and bring the engine down to a low speed. The gears would be shifted after the clutch pedal was depressed and the engine running at a lower speed. As soon as the operator released clutch pedal 32 preparatory to engaging the clutch, contacts 29 would separate, deenergizing solenoid 27 and spring 35 would move valve 33 to the right again placing groove 34 in line with conduit 18 and connecting the suction device with the air bleed orifice 23. This would permit spring 7 to open valve 4 to again increase the speed of the engine to its governed speed.

It is, of course, appreciated that valve 33 can be operated to close off air bleed conduit 18 in numerous ways to slow down the engine speed preparatory to shifting gears. The operation of valve 33 by means of solenoid 27 and controlling the making and breaking of the solenoid circuit by means of clutch pedal 32 is merely one illustrative way of controlling valve 33.

It should also be understood that my device will work as an automatic throttle control for an internal combustion engine even though the centrifugal air bleed valve mechanism 19 to 26 is omitted. In such case, as shown in Fig. 2, conduit 18 would bleed direct to atmosphere through orifice 45 and solenoid operated valve 33 would control this bleed in the manner above outlined. In such case if throttle rod 8 were retracted and the operator neglected or refrained from moving rod 8 to the right to close valve 4 preparatory to shifting gears, as soon as clutch pedal 32 was moved to disengage the clutch, contacts 29 would be closed and the energized solenoid 27 would move valve 33 to close air bleed conduit 18 thereby causing the suction device 9 to close the valve 4 and lower the speed of the engine. Upon release of clutch pedal 32, solenoid 27 would be deenergized, spring 35 would again shift valve 33 to open air bleed 18 and bleed down the vacuum in suction chamber 10 and thereby permit spring 7 to open throttle 4 to increase the speed of the engine.

A mechanical connection between plunger 33 and clutch pedal 32 could be used instead of electrical control if desired.

Compression spring 42 backs up pivoted contact lever 43. Thus lever 43 will move with spring arm 30 as soon as the contacts 29 are closed. This permits contacts 29 to close as soon as the clutch pedal 32 is depressed slightly to begin to disengage the clutch and to remain in contact while pedal 32 is depressed further to fully disengage the clutch.

Valve 44 is a needle valve controlling the fluid flow through conduit 18 between the suction chamber 10 and the point at which branch conduits 13 and 16 join conduit 18.

I claim:

1. In a power mechanism of the class wherein an internal combustion engine transmits its power through a variable speed transmission, the combination of an intake passageway for said engine, a throttle valve controlling the flow of motive fluid through said passageway, a suction device actuated through changes of pressure in the intake passageway for imparting movement to said throttle valve, said suction device responding to sub-atmospheric pressure in the intake passageway on the engine side of the throttle valve for closing said valve, mechanism actuatable to shut off the below-mentioned valve controlled fluid bleed means preliminary to effecting a change of the speed ratio of said variable speed transmission, and valve controlled fluid bleed means for said suction device controlled by the actuation of the aforesaid mechanism to close off the fluid bleed to said suction device whereby the suction device responds to intake passageway pressure and moves said throttle valve toward closed position and slows down the speed of the engine to thereby facilitate changing the speed ratio of the variable speed transmission.

2. In a power mechanism of the class wherein an internal combustion engine transmits its power through a variable speed transmission and it is desirable to slow down the engine speed before changing the speed ratio of such transmission, the combination of an intake passageway for said engine, a throttle valve controlling the flow of motive fluid through said passageway, a suction device actuated through changes of pressure in the intake passageway for imparting movement to said throttle valve, a conduit connecting said suction actuated device into the intake passageway on the engine side of said throttle valve, said suction device responding to sub-atmospheric pressure in the intake passageway on the engine side of the throttle valve for closing said valve, mechanism actuatable to shut off the below-mentioned valve controlled fluid bleed means preliminary to effecting a change of the speed ratio of said variable speed transmission, and valve controlled fluid bleed means for said suction device controlled by the actuation of the aforesaid mechanism to close off the fluid bleed to said suction device whereby the suction device responds to intake passageway pressure and moves said throttle valve toward closed position and slows down the speed of the engine.

3. In a power mechanism of the class wherein an internal combustion engine transmits its power through a variable speed shiftable gear transmission, the combination of an intake passageway for said engine, a throttle valve controlling the flow of motive fluid through said passageway, a suction device actuated through changes of pressure in the intake passageway for imparting movement to said throttle valve, said suction device responding to sub-atmospheric pressure in the intake passageway on the engine side of the throttle valve for closing said valve, mechanism actuatable to shut off the below-mentioned valve controlled fluid bleed means preliminary to shifting the gears and effecting a change of the gear ratio of said variable speed transmission, and valve controlled fluid bleed means for said suction device controlled by the actuation of the aforesaid mechanism to close off the fluid bleed to said suction device whereby the suction device responds to intake passageway pressure and moves said throttle valve toward closed position and slows down the speed of the engine to thereby facilitate shifting of the transmission gears to change the speed ratio of the variable speed transmission.

4. The combination as set forth in claim 2 including a venturi in the intake passageway on the atmosphere side of the said throttle valve, and a conduit connecting the suction device into said venturi.

5. In a power mechanism of the class wherein an internal combustion engine transmits its power through a variable speed transmission and it is desirable to slow down the engine speed before changing the speed ratio of such transmission, the combination of an intake passageway for said engine, a throttle valve controlling the flow of motive fluid through said passageway, a suction device actuated through changes of pressure in the intake passageway for imparting movement to said throttle valve, said suction device responding to sub-atmospheric pressure in the intake passageway on the engine side of the throttle valve for closing said valve, mechanism actuatable to close the below-mentioned fluid bleed valve preliminary to effecting a change of the speed ratio of said variable speed transmission, an air bleed for said suction device, a valve controlling said air bleed, and electromagnetic means energized by the actuation of the aforesaid mechanism to close said air bleed valve and shut off the air bleed to said suction device whereby the suction device responds to intake passageway pressure and moves said throttle valve toward closed position and slows down the speed of the engine to facilitate changing the speed ratio of the variable speed transmission.

6. The combination as set forth in claim 5 including a venturi in the intake passageway on the atmosphere side of the said throttle valve, and a conduit connecting the suction device into said venturi.

7. In a power mechanism of the class wherein an internal combustion engine transmits its power through a variable speed transmission and it is desirable to slow down the engine speed before changing the speed ratio of such transmission, the combination of an intake passageway for said engine, a throttle valve controlling the flow of motive fluid through said passageway, a suction device actuated through changes of pressure in the intake passageway for imparting movement to said throttle valve, said suction device responding to sub-atmospheric pressure in the intake passageway on the engine side of the throttle valve for closing said valve, clutch mechanism between the engine and transmission and actuatable to disconnect the engine from said transmission preliminary to effecting a change of the speed ratio of said variable speed transmission, and valve controlled fluid bleed means for said suction device controlled by the actuation of the aforesaid clutch mechanism to close off the fluid bleed to said suction device whereby the suction device responds to intake passageway pressure and moves said throttle valve toward closed position and slows down the speed of the engine to facilitate changing the speed ratio of the variable speed transmission.

8. In an internal combustion engine having an intake passageway, the combination of a governor throttle valve controlling the flow of motive fluid through said passageway, a suction device actuated through changes of pressure in the intake passageway for imparting movement to said throttle valve, a fluid bleed orifice for said suction device, a speed controlled valve tending to close said fluid bleed orifice when the engine reaches its governed speed whereby the suction device moves said throttle valve toward closed position and tending to open said orifice as the engine falls below its governed speed whereby the suction device moves said throttle valve toward open position, and independently operated valve mechanism actuatable to shut off said air bleed to the suction device whereby the suction device responds to the pressure in the intake passageway on the engine side of said governor valve and moves said governor valve toward closed position to throttle down the speed of the engine.

9. In an internal combustion engine having an intake passageway, the combination of a governor throttle valve controlling the flow of motive fluid through said passageway, a suction device actuated through changes of pressure in the intake passageway for imparting movement to said throttle valve, a valve housing rotated in accordance with the speed of the engine, an air bleed orifice in said housing, a passageway connecting the interior of the housing and said air bleed orifice with the suction device, a centrifugally unbalanced piston valve in said housing controlling said air bleed orifice, said piston valve itself responding to centrifugal force and tending to close said air bleed orifice as the engine reaches its governed speed and tending to open said air bleed orifice as the engine falls below its governed speed whereby the suction device responds to the intake passageway pressure to actuate said throttle valve and maintain the governed speed of the engine, and independently operated valve mechanism actuatable to shut off said air bleed to the suction device whereby the suction device responds to the pressure in the intake passageway on the engine side of said governor valve and moves said governor valve toward closed position to throttle down the speed of the engine.

10. In a power mechanism of the class wherein an internal combustion engine transmits its power through a variable speed transmission and it is desirable to slow down the engine speed before changing the speed ratio of such transmission, the combination of an intake passageway for said engine, a throttle valve controlling the flow of motive fluid through said passageway, a suction device actuated through changes of pressure in the intake passageway for imparting movement to said throttle valve, a fluid bleed orifice for said suction device, a speed controlled valve tending to close said fluid bleed orifice when the engine reaches its governed speed and tending to open said orifice as the engine falls below its governed speed whereby the suction device responds to the intake passageway pressure and actuates said throttle valve to maintain the governed speed of said engine, mechanism actuatable to shut off the below-mentioned valve controlled fluid bleed means preliminary to effecting a change of the speed ratio of said variable speed transmission, and valve controlled fluid bleed means for said suction device controlled by the actuation of the aforesaid mechanism to close off the fluid bleed to said suction device whereby the suction device responds to intake passageway pressure and moves said throttle valve toward closed position and slows down the speed of the engine to facilitate changing the speed ratio of the variable speed transmission.

11. In a power mechanism of the class wherein an internal combustion engine transmits its power through a variable speed transmission, the combination of an intake passageway for said engine, a throttle valve controlling the flow of motive fluid through said passageway, a suction device actuated through changes of pressure in the intake passageway for imparting movement to said throttle valve, said suction device responding to sub-atmospheric pressure in the intake passageway on the engine side of the throttle valve for closing said valve, mechanism actuatable to shut off the below-mentioned valve controlled fluid bleed means preliminary to effecting a change of the speed ratio of said variable speed transmission and also actuatable subsequently to effecting said change in speed ratio of said variable speed transmission, and valve controlled fluid bleed means for said suction device controlled by the actuation of the aforesaid mechanism preliminary to effecting change in the speed ratio of said transmission to close off the fluid bleed to said suction device whereby the suction device responds to intake passageway pressure and moves said throttle valve toward closed position and slows down the speed of the engine to facilitate changing the speed ratio of the variable speed transmission, said valve controlled fluid bleed means being also controlled by the actuation of the aforesaid mechanism subsequently to effecting a change in speed ratio of the transmission to open said fluid bleed to said suction device whereby the suction device moves said throttle valve toward open position.

MARION MALLORY.

REFERENCES CITED

The following references are of record in the file of this patent:

UNITED STATES PATENTS

| Number | Name | Date |
|---|---|---|
| 1,620,764 | Hull | Mar. 15, 1927 |
| 2,289,014 | Howard | July 7, 1942 |
| 2,302,085 | Wolfe et al. | Nov. 17, 1942 |
| 2,322,764 | Mallory | June 29, 1943 |